US011388600B2

(12) United States Patent
Anand et al.

(10) Patent No.: US 11,388,600 B2
(45) Date of Patent: Jul. 12, 2022

(54) METHOD AND ELECTRONIC DEVICE FOR AUTOMATICALLY SWITCHING AMONG PLURALITY OF PROFILES IN ESIM

(71) Applicant: SAMSUNG ELECTRONICS CO., LTD., Suwon-si (KR)

(72) Inventors: Satyajit Anand, Bangalore (IN); Sreenath Dindukurthi, Bangalore (IN); Amit Arvind Mankikar, Bangalore (IN); Sivareddy Rangareddy Gari, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 53 days.

(21) Appl. No.: 16/526,381

(22) Filed: Jul. 30, 2019

(65) Prior Publication Data

US 2020/0037153 A1    Jan. 30, 2020

(30) Foreign Application Priority Data

Jul. 30, 2018   (IN) .............................. 201841028593
Jul. 2, 2019    (IN) .............................. 201841028593

(51) Int. Cl.
*H04W 12/00*   (2021.01)
*H04W 48/14*   (2009.01)
(Continued)

(52) U.S. Cl.
CPC ........... *H04W 12/72* (2021.01); *H04W 8/186* (2013.01); *H04W 8/20* (2013.01); *H04W 12/35* (2021.01); *H04W 12/45* (2021.01); *H04W 48/14* (2013.01)

(58) Field of Classification Search
CPC ......... H04M 1/72569; H04W 12/0023; H04W 12/00405; H04W 12/00514; H04W 48/14; H04W 48/18; H04W 8/183; H04W 8/20
See application file for complete search history.

(56) References Cited

U.S. PATENT DOCUMENTS 8,965,366 B1 * 2/2015 Somayajula .......... H04W 8/245
                                                    455/418
9,609,613 B1   3/2017 Osterwise
(Continued)

FOREIGN PATENT DOCUMENTS

CN   106453884 A  *  2/2017
CN   107959951 A     4/2018
(Continued)

OTHER PUBLICATIONS

International Search Report (PCT/ISA/210) dated Oct. 30, 2019 issued by the International Searching Authority in International Application No. PCT/KR2019/009398.
(Continued)

*Primary Examiner* — Yong Hang Jiang
(74) *Attorney, Agent, or Firm* — Sughrue Mion, PLLC

(57) ABSTRACT

A method for automatically switching among a plurality of embedded subscriber identity module (eSIM) profiles in an electronic device is provided. The method may include: determining a plurality of contexts of the electronic device while a first eSIM profile of the plurality of eSIM profiles is enabled in the electronic device; determining, from the plurality of eSIM profiles, a second eSIM profile that has a highest profile weight, based on the plurality of contexts of the electronic device, while the first eSIM profile is enabled in the electronic device; and automatically switching from the first eSIM profile to the second eSIM profile in the electronic device.

15 Claims, 10 Drawing Sheets

(51) Int. Cl.
*H04W 8/18* (2009.01)
*H04W 8/20* (2009.01)
*H04W 12/72* (2021.01)
*H04W 12/30* (2021.01)
*H04W 12/45* (2021.01)

(56) References Cited

U.S. PATENT DOCUMENTS

| | | | |
|---|---|---|---|
| 2008/0081609 A1* | 4/2008 | Burgan | H04W 8/18 455/425 |
| 2008/0222038 A1* | 9/2008 | Eden | G06Q 20/20 705/44 |
| 2010/0110890 A1* | 5/2010 | Rainer | H04W 4/24 370/232 |
| 2013/0024480 A1* | 1/2013 | Okun | G06F 11/324 707/802 |
| 2015/0004955 A1 | 1/2015 | Li et al. | |
| 2015/0296369 A1* | 10/2015 | Berionne | H04W 8/183 455/418 |
| 2015/0373530 A1* | 12/2015 | Stein | H04M 1/72406 455/411 |
| 2015/0382178 A1* | 12/2015 | Park | H04W 12/06 455/411 |
| 2016/0044692 A1* | 2/2016 | Egner | H04L 5/006 370/330 |
| 2017/0215163 A1 | 7/2017 | Osterwise | |
| 2017/0289788 A1 | 10/2017 | Lalwaney | |
| 2018/0020342 A1 | 1/2018 | Park et al. | |
| 2018/0063201 A1* | 3/2018 | Zhang | H04L 12/4641 |
| 2020/0322846 A1* | 10/2020 | Hampali | H04W 28/24 |

FOREIGN PATENT DOCUMENTS

| | | |
|---|---|---|
| EP | 2 900 015 A1 | 7/2015 |
| WO | 2017/172604 A1 | 10/2017 |
| WO | 2018/020007 A1 | 2/2018 |

OTHER PUBLICATIONS

Written Opinion (PCT/ISA/237) dated Oct. 30, 2019 issued by the International Searching Authority in International Application No. PCT/KR2019/009398.
Communication dated Oct. 22, 2020, issued by the India Intellectual Property Office in Indian Patent Application No. 201841028593.
Communication dated May 26, 2021, issued by the European Patent Office in counterpart European Application No. 19843832.7.

* cited by examiner

METHOD AND ELECTRONIC DEVICE FOR AUTOMATICALLY SWITCHING AMONG PLURALITY OF PROFILES IN ESIM

CROSS-REFERENCE TO RELATED APPLICATIONS

This application is based on and claims priority under 35 U.S.C. § 119(a) to Indian Provisional Patent Application No. 201841028593 (PS), which was filed in the Indian Patent Office on Jul. 30, 2018 and Indian Complete Patent Application No. 201841028593 (CS), which was filed on Jul. 2, 2019, the disclosures of which are incorporated herein by reference in their entireties.

BACKGROUND

1. Field

Apparatuses and methods consistent with example embodiments relate to device management, and more particularly to automatically switching among a plurality of profiles in embedded SIM of an electronic device.

2. Description of Related Art

In general, electronic devices provide a slot for inserting a subscriber identity module (SIM) card, which enables access to a communication network. With the advancement in technology, an embedded SIM (eSIM) which is an embedded integrated circuit card (eUICC) is introduced. The eSIM accommodates multiple profiles belonging to same or different operators within an electronic device. The eSIM provides a number of advantages to a user. The user may use one number for corporate activities and another number for personal calls or have a data roaming profile for use in another country, etc. The user could even have totally a separate voice and data plan, switch operators quickly to get connected if the user is in an area with no signal, free up space for new features or additional battery life.

However, in case of the eSIM, only one profile can be enabled at a time while all other profiles are disabled. The user manually selects the profile to be enabled from among the multiple profiles of the eSIM based on a requirement such as data, corporate activities, personal call, etc. For this reason, the user has to follow a series of pre-determined steps to perform profile switching every time the user wants to use a different profile which can be cumbersome and time consuming. Also, the user may not be aware about the best profile for a specific usage.

For example, consider that the user wants to download a video of size 180 MB but the available data in the profile enabled on the electronic device does not match the requirement. Then, the user will have to manually switch to another profile and check if the video can be downloaded using the same. Further, the user will have to repeat the series of pre-determined steps to perform profile switching until a suitable profile to download the video is found.

SUMMARY

Provided is a method for automatically switching among a plurality of profiles in an embedded subscriber identity module (eSIM) of an electronic device.

One or more embodiments are provided to determine a plurality of contexts of the electronic device while a first profile from the plurality of profiles is enabled in the electronic device, to determine a profile weight of the plurality of profiles in the eSIM of the electronic device, and/or to determine a second profile from the plurality of profiles based on the profile weight of the plurality of contexts of the electronic device.

Further, one or more embodiments are provided to automatically switch to the second profile by enabling the second profile and disabling the first profile on the electronic device.

Still further, one or more embodiments are provided to recommend the second profile to a user and enable the user to switch to the second profile by manually enabling the second profile and disabling the first profile on the electronic device.

According to an aspect of an embodiment, there is provided a method for automatically switching among a plurality of embedded subscriber identity module (eSIM) profiles in an electronic device, the method including: determining a plurality of contexts of the electronic device while a first eSIM profile of the plurality of eSIM profiles is enabled in the electronic device; determining, from the plurality of eSIM profiles, a second eSIM profile that has a highest profile weight, based on the plurality of contexts of the electronic device, while the first eSIM profile is enabled in the electronic device; and automatically switching from the first eSIM profile to the second eSIM profile in the electronic device.

The determining the second eSIM profile may include: determining a context weight of each of the plurality of contexts by applying a weight factor to each of the contexts of the electronic device; determining a profile weight by combining all the determined context weights; and determining the second eSIM profile from the plurality of eSIM profiles based on the profile weight.

The method may further include: displaying the second eSIM profile on a screen of the electronic device, together with the plurality of contexts used in determining the profile weight.

The automatically switching from the first eSIM profile to the second eSIM profile in the electronic device may include: automatically disabling the first eSIM profile in the electronic device; and automatically enabling the second eSIM profile in the electronic device.

The plurality of contexts of the electronic device may be dynamically determined based on a plurality of contextual parameters of the electronic device.

The plurality of contextual parameters may include at least one of a location of the electronic device, a dialed number, a tariff policy of the plurality of eSIM profiles, signal strengths associated with the plurality of eSIM profiles, user history, and a user preference.

The plurality of contexts may include at least one of a location-based context, a device-based context, and a network-based context.

The weight factor may be dynamically determined based on a plurality of contextual parameters and a user preference.

The determining the second eSIM profile may include: determining a current location of the electronic device; and determining the second eSIM profile based on user history indicating a user's frequently used eSIM profile in the current location of the electronic device, among the plurality of eSIM profiles.

The determining the second eSIM profile may include determining the second eSIM profile based on a signal strength of each of the plurality of eSIM profiles.

According to an aspect of another embodiment, there is provided a non-transitory computer-readable storage medium storing a program that is executable by a computer to perform the method for automatically switching among the eSIM profiles.

According to an aspect of another embodiment, there is provided an electronic device for automatically switching among a plurality of embedded subscriber identity module (eSIM) profiles in the electronic device, the electronic device including a processor configured to: determine a plurality of contexts of the electronic device while a first eSIM profile of the plurality of eSIM profiles is enabled in the electronic device; determine, from the plurality of eSIM profiles, a second eSIM profile that has a highest profile weight, based on the plurality of contexts of the electronic device, while the first eSIM profile is enabled in the electronic device; and automatically switch from the first eSIM profile to the second eSIM profile in the electronic device.

The processor may be further configured to: determine a context weight of each of the plurality of contexts by applying a weight factor to each of the contexts of the electronic device; determine a profile weight by combining all the determined context weights; and determine the second eSIM profile from the plurality of eSIM profiles based on the profile weight.

The electronic device may further include a display, wherein the processor is further configured to control the display to display the second eSIM profile together with the plurality of contexts used in determining the profile weight.

The processor may be further configured to: automatically disable the first eSIM profile in the electronic device; and automatically enable the second eSIM profile in the electronic device.

The processor may be further configure to determine the plurality of contexts of the electronic device based on a plurality of contextual parameters of the electronic device.

The plurality of contextual parameters may include at least one of a location of the electronic device, a dialed number, a tariff policy of the plurality of eSIM profiles, signal strengths associated with the plurality of profiles, user history, and a user preference.

The plurality of contexts may include at least one of a location-based context, a device based context, and a network based context.

The processor may be further configured to determine the weight factor based on the plurality of contextual parameters and a user preference.

The processor may be further configured to determine the second eSIM profile based on user history indicating a user's frequently used eSIM profile in a current location of the electronic device, among the plurality of eSIM profiles.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
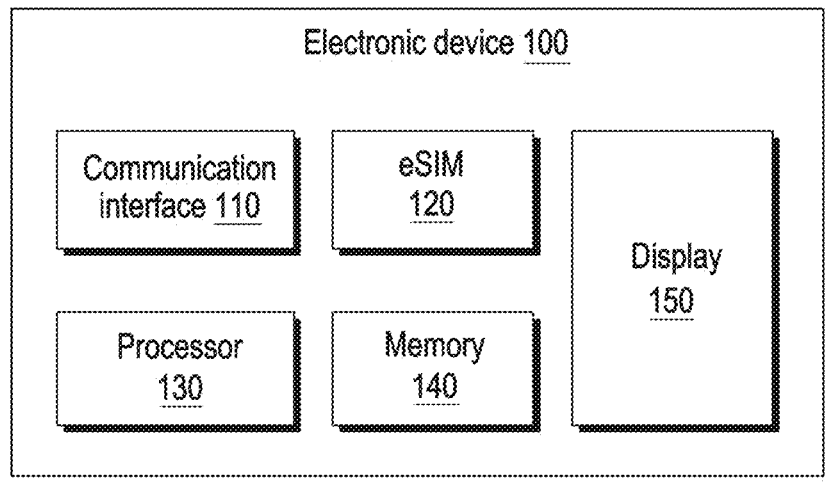
FIG. 1A is a block diagram of an electronic device for automatically switching among a plurality of profiles in an eSIM, according to an embodiment as disclosed herein.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for automatically switching among a plurality of profiles in an embedded subscriber identity module (eSIM) of an electronic device. The method includes determining, by the electronic device, a plurality of contexts of the electronic device while a first profile from the plurality of profiles is enabled in the electronic device. Further, the method includes determining, by the electronic device, a second profile from the plurality of profiles based on the plurality of contexts of the electronic device and automatically switching, by the electronic device, from the first profile to the second profile in the electronic device.

In an embodiment, the determining the second profile from the plurality of profiles based on the plurality of contexts of the electronic device includes determining a context weight of each of the plurality of contexts by combining a weight factor to each of the contexts of the electronic device. The method also includes determining a profile weight by combining all the determined context weights and determining the second profile from the plurality of profiles based on the profile weight.

In an embodiment, the method further includes displaying the second profile determined from the plurality of profiles on a screen of the electronic device 100, wherein the second profile is displayed with the plurality of contexts used in determining the profile weight.

In an embodiment, automatically switching from the first profile to the second profile in the electronic device includes automatically disabling the first profile in the electronic device and automatically enabling the second profile in the electronic device.

In an embodiment, the plurality of contexts of the electronic device is dynamically determined based on a plurality of contextual parameters of the electronic device.

In an embodiment, the plurality of contextual parameters include at least one of a location of the electronic device, a dialed number, a tariff of the plurality of profiles, signal strength associated with the plurality of profiles, user history and the like.

In an embodiment, the plurality of contexts include at least one of a location-based context, a device based context, a network based context, and the like.

In an embodiment, the weight factor is dynamically determined based on the plurality of contextual parameters and a user preference.

In the conventional methods and systems, the user has to manually switch from the first profile to the second profile. Unlike to the conventional methods and systems, the proposed method enables the electronic device to automatically switch from the first profile to the second profile based on the profile weights of the plurality of profiles.

In the conventional methods and systems, the user may not be aware about the best profile to be selected in a given scenario. Unlike to the conventional methods and systems, in the proposed method, the electronic device monitors the plurality of contexts each having a weight. Further, the electronic device determines the best profile suitable for the given scenario based on the profile weight.

FIG. 1A is a block diagram of the electronic device 100 for automatically switching among the plurality of profiles in the eSIM 120, according to an embodiment as disclosed herein.

Referring to FIG. 1A, examples of the electronic device 100 may include a laptop, a Personal Computer, a mobile phone, a smart phone, Personal Digital Assistant (PDA), a tablet, a wearable device, or the like. In an embodiment, the electronic device 100 may include a communication interface 110, the embedded subscriber identity module (eSIM) 120, a processor 130, a memory 140 and a display 150.

Figure 3:
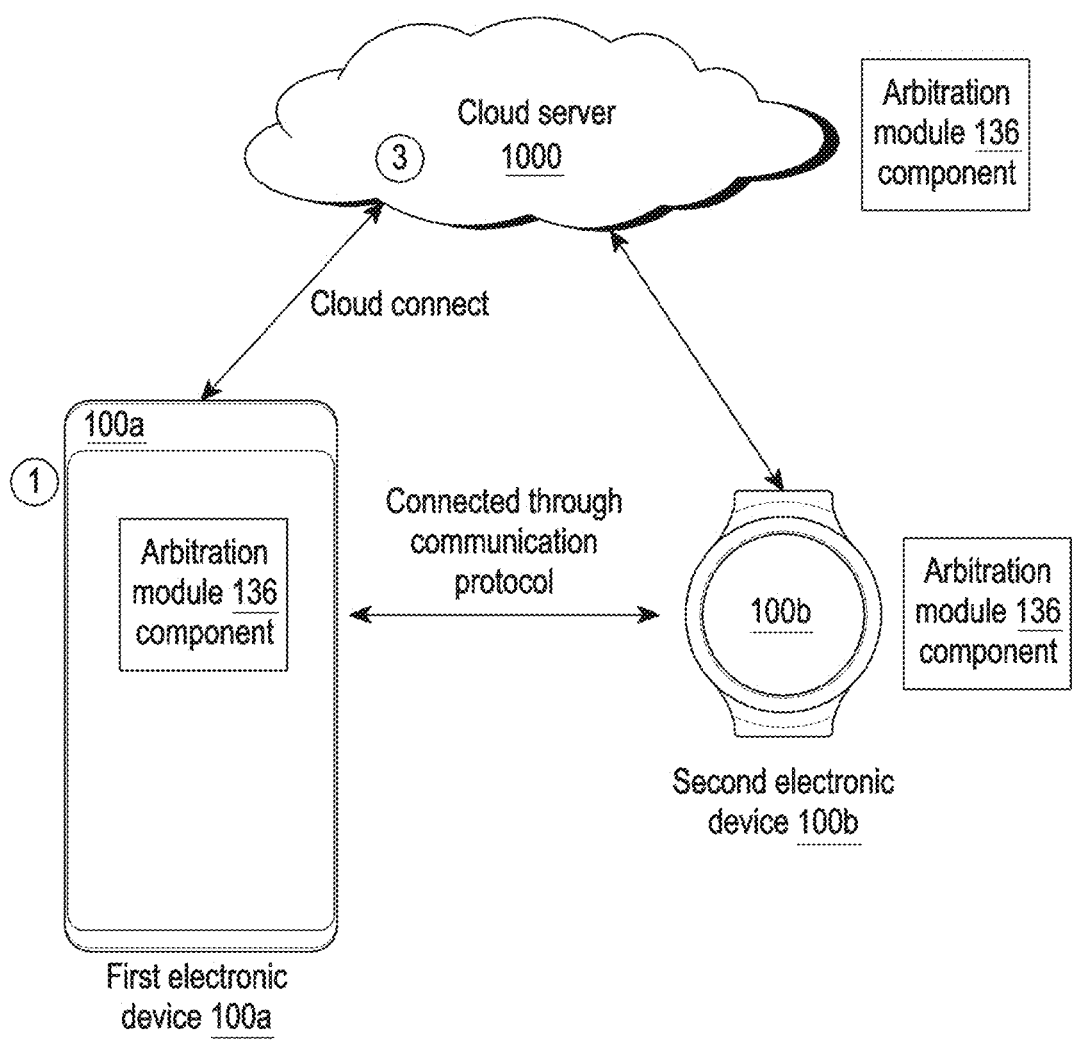
FIG. 3 illustrates a plurality of electronic devices in synchronization using which a plurality of contexts is determined by the electronic device, according to an embodiment as disclosed herein.

In an embodiment, the communication interface 110 is configured to communicate with other connected electronic devices (e.g., a second electronic device 100b, a cloud server 1000, etc.) as shown in FIG. 3. The communication interface 110 may use a communication protocol, such as for example, Bluetooth, Near Field Communication (NFC), ZigBee, RuBee, and Wireless Local Area Network (WLAN) functions, etc.

The eSIM 120 is installed as an integrated circuit (IC) in the electronic device 100 and enables a change of a network operator (e.g., a wireless service provider, wireless carrier, cellular company, or mobile network carrier) without requiring the removal of the eSIM 120 by virtue of an over-the-air (OTA) technology, and thus can be continued to be used while the network operator is being changed.

The eSIM 120 may store and enable a plurality of profiles of same or different network operators. Examples of the plurality of profiles may include operator profiles and operational profiles. The operator profiles may be programmed during manufacture, and may carry information that enables identification and authentication of the eSIM 120 with the selected networks. The operational profiles may contain one or more network access applications and associated network access credentials and operators' applications (e.g., SIM toolkit).

In an embodiment, the processor 130 is configured to determine a plurality of contexts of the electronic device 100 while the first profile from the plurality of profiles is enabled in the electronic device 100. The processor 130 is also configured to determine the second profile from the plurality of profiles based on the plurality of contexts of the electronic device 100 and automatically switch from the first profile to the second profile in the electronic device 100. The plurality of contexts of the electronic device 100 is dynamically determined based on a plurality of contextual parameters of the electronic device 100. The plurality of contextual parameters include at least one of a location of the electronic device 100, a type of a dialed number, a tariff plan of the plurality of profiles, a signal strength associated with the plurality of profiles, user history and the like. The plurality of contexts includes at least one of a location-based context, a device based context, a network based context, and the like.

For example, the context may be a location-based context and the contextual parameter may be the current location of the electronic device 100 (e.g., office premises, gym premises, etc.). In another example, the context may be a network-based context and the contextual parameter may be a network type (e.g., a wireless or WiFi network, a cellular network, a Bluetooth network, etc.) that is used by the electronic device 100. Therefore, the plurality of contexts is dynamically determined based on the plurality of contextual parameters.

Further, the automatic switching between the plurality of profiles of the electronic device 100 is performed in accordance with a General Data Protection Regulation (GDPR) enactment and federated learning experience. The GDPR enactment is location specific and hence the plurality of contextual parameters is determined accordingly.

In another embodiment, the processor 130 is configured to determine the plurality of contexts of the electronic device 100 while the first profile from the plurality of profiles is enabled in the electronic device 100. The processor 130 is also configured to determine the second profile from the plurality of profiles based on the plurality of contexts of the electronic device 100 and display a recommendation on the display 150 of the electronic device 100. The recommendation includes details of the second profile to which the user is recommended to switch in order to obtain an enhanced user experience. The user may manually switch to the second profile recommended by the processor 130 or choose to continue with the first profile which is enabled in the electronic device 100.

For example, consider that the electronic device 100 based on the context of the user history recommends the user to switch to a corporate profile while the user enters the office premises. However, the user either switches to the corporate profile or continues with the existing profile enabled in the electronic device 100.

Further, the electronic device 100 allows the user to disable the profile swapping feature overall and continue with the feature of the manual switching between the first profile and the second profile as and when required.

In an embodiment, the memory 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be implemented as a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 is configured to store larger amounts of information than the memory. In certain examples, a non-transitory storage medium may store data that can, over time, change (e.g., in Random Access Memory (RAM) or cache).

In an embodiment, the display 150 may be a portion of the screen of the electronic device 100 or the entire screen of the electronic device 100 which is used to display information related to the plurality of contexts. The display 150 is also configured to display the second profile which is determined by the processor 130 along with the plurality of contexts which are used to determine the profile weight. The second profile may be displayed as a message, a pop-up window, a widget, etc.

Although the FIG. 1A shows the hardware elements of the electronic device 100 but it is to be understood that other embodiments are not limited thereon. In other embodiments, the electronic device 100 may include less or more number of elements. Further, the labels or names of the elements are used only for illustrative purpose and does not limit the scope of the invention. One or more components may be combined together to perform same or substantially similar function.

Figure 1B:
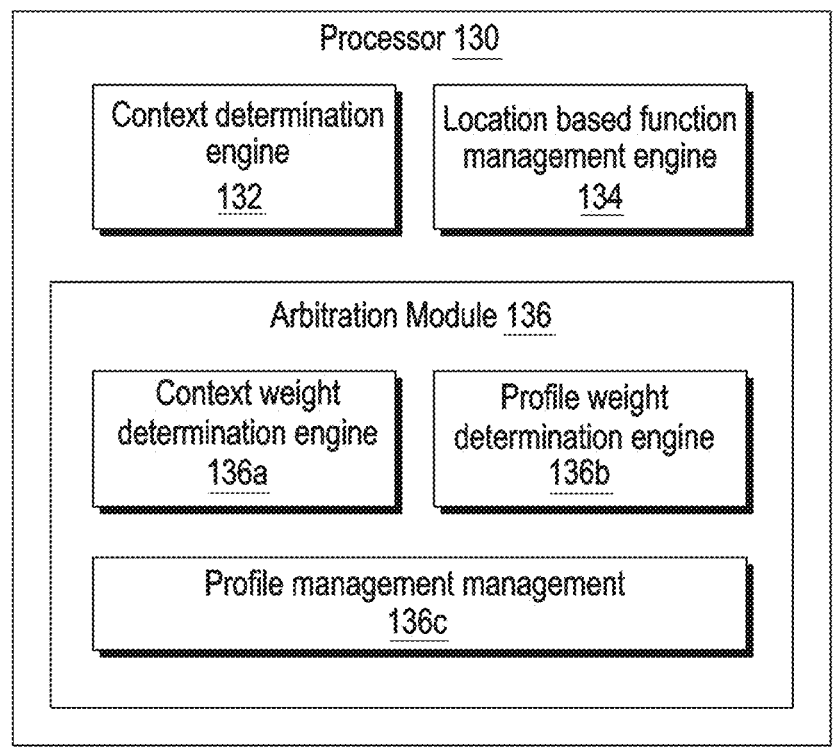
FIG. 1B is a block diagram of a processor of the electronic device for automatically switching among the plurality of profiles in the eSIM, according to an embodiment as disclosed herein.

FIG. 1B is a block diagram of the processor 130 of the electronic device 100 for automatically switching among the plurality of profiles in the eSIM 120, according to an embodiment as disclosed herein.

Referring to the FIG. 1B, the processor 130 includes a context determination engine 132, a location based function management engine 134, an arbitration module 136 which includes a context weight determination engine 136a, a profile weight determination engine 136b and a profile management engine 136c.

The context determination engine 132 is configured to determine the plurality of contexts such as for example, the location-based context, the device based context, the network based context, and the like. Further, the context determination engine 132 also determines the plurality of context parameters associated with the plurality of contexts. The plurality of context parameters are for example, at least one of the location of the electronic device 100, the type of the dialed number, the tariff plan of the plurality of profiles, signal strength associated with the plurality of profiles, user history and the like. The electronic device 100 displays the plurality of contexts determined by the context determination engine 132 on the display 150 of the electronic device 100. Further, the electronic device 100 also allows the user to deselect the at least one of the plurality of contexts determined by the context determination engine 132. When the user deselects the at least one of the plurality of contexts determined by the context determination engine 132, then the arbitration module 136 determines the context weight excluding the deselected at least one of the plurality of contexts.

The location based function management engine 134 is configured to determine the location of the electronic device 100 based on a signal obtained from a Global Positioning System (GPS), or an Internal Protocol (IP) address of the electronic device 100. Further, the location of the electronic device 100 is used to determine the GDPR enactment which is to be applied based on the location. The GDPR enactment is jurisdiction specific and hence dynamic with respect to the location of the electronic device 100. For example, when the electronic device 100 is operated in India, the GDPR enactment is in consonance with Indian legal system. When the same electronic device 100 is operated in Japan, the GDPR enactment is in consonance with Japanese legal system.

The arbitration module 136 is configured to determine the context weight of each of the determined contexts and the profile weight of each of the profiles of the plurality of profiles. Further, the arbitration module 136 is configured to determine the second profile from the plurality of profiles to be enabled based on the profile weight.

The context weight determination engine 136a is configured to receive the plurality of contexts from the context determination engine 132 and multiply each of the plurality of contexts with the weight of each of the plurality of contexts. Consider the plurality of contexts C1, C2, C3, and C4 having weight W1, W2, W3, and W4, respectively. For example, with regard to the first profile P1, the first context weight W1 for the first context C1 may be obtained by applying a corresponding weight factor (e.g., 1) to the first context weight W1, the second context weight W2 for the second context C2 may be obtained by applying a corresponding weight factor (e.g., 0) to the second context weight W2, the third context weight W3 for the third context C3 may be obtained by applying a corresponding weight factor (e.g., 1) to the third context weight W3, the fourth context weight W4 for the fourth context C4 may be obtained by applying a corresponding weight factor (e.g., 1) to the fourth context weight W4, and the fifth context weight W5 for the fifth context C5 may be obtained by applying a corresponding weight factor (e.g., 0) to the fifth context weight W5.

Figure 1C:
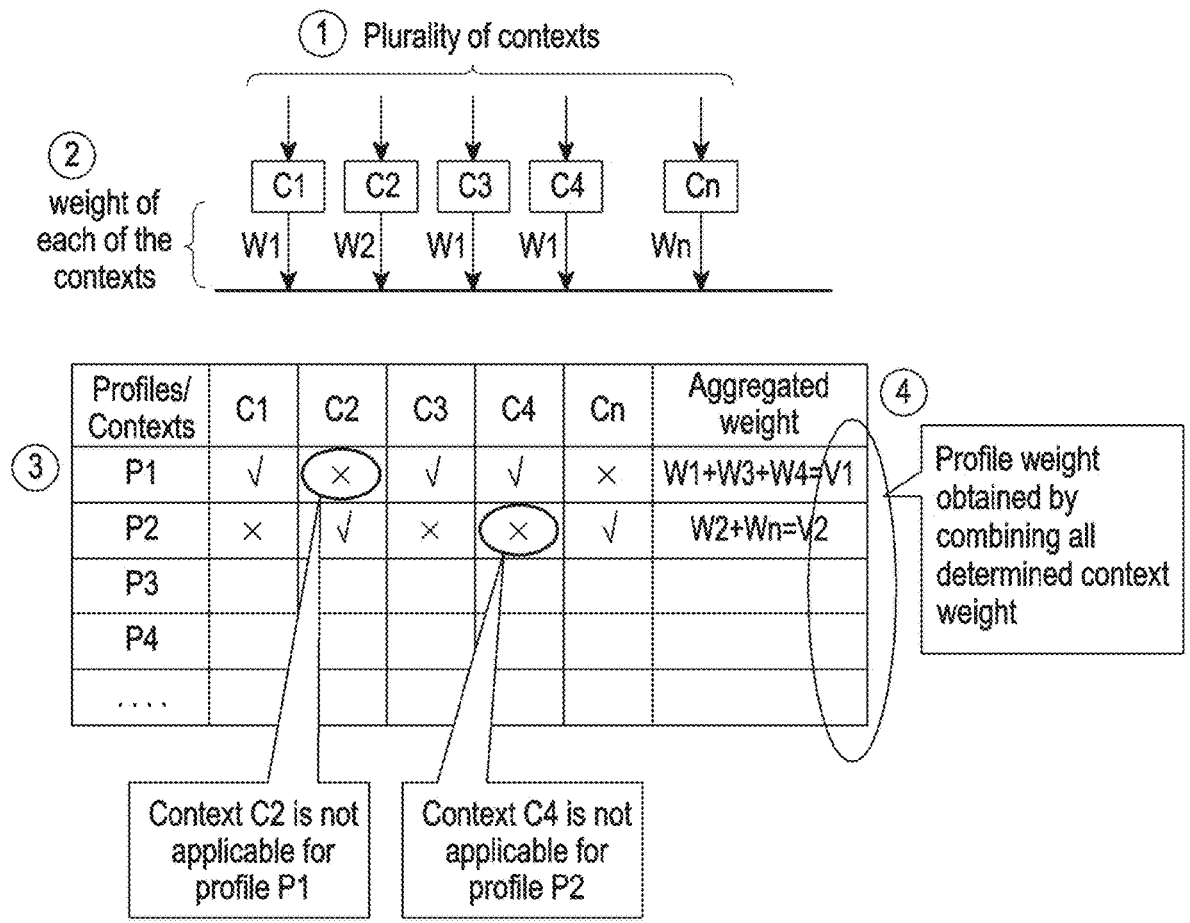
FIG. 1C illustrates a method of determination of profile weights of the plurality of profiles in the electronic device, according to an embodiment as disclosed herein.

The profile weight determination engine 136b is configured to determine the profile weight V1, V2, V3, etc. of each of the profiles P1, P2, P3, etc. by combining all the determined context weights (e.g., V1=W1+W3+W4 as described in FIG. 1C).

The profile management engine 136c is configured to determine the most suitable profile (e.g., the second profile) based on the profile weight determined by the profile weight determination engine 136b. The second profile is then automatically enabled in the electronic device 100 and the first profile is automatically disabled in the electronic device 100 by the profile management engine 136c.

In another embodiment, the profile management engine 136c is configured to display the recommendation of the second profile on the display 150 of the electronic device 100 along with active icons enabling an activation of the second profile. Therefore, the user is allowed to manually select and enable the second profile recommended by the profile management engine 136c. Further, in case the user chooses to not enable the second profile recommended by the profile management engine 136c, then the electronic device 100 continues to operate on the first profile.

FIG. 1C illustrates the method of determination of the profile weights of the plurality of profiles in the electronic device 100, according to an embodiment as disclosed herein.

Referring to the FIG. 1C, at step 1 (circled number 1), the plurality of contexts C1, C2, C3, C4 are determined by the context determination engine 132. Further, the context determination engine 132 also determines whether a particular context is applicable for a particular profile. For example, as shown in FIG. 1C, the context C2 is not applicable for the profile P1, and the context C4 is not applicable for the profile P2. By default, all the contexts associated with the electronic device 100 are considered by the context determination engine 132. However, in case the user of the electronic device 100 manually deselects any of the contexts associated with the electronic device 100, then the contexts deselected by the user will not be applicable for a particular profile.

At step 2 (circled number 2), the weight of each of the plurality of applicable contexts (e.g., weight W1 of the context C1, weight W3 of the context C3, and weight W4 of the context C4), is determined by the arbitration module 136.

At step 3 (circled number 3), the context weight for the plurality of contexts is obtained as follows:

Context weight for the context $C1=W1$ (1)

Context weight for the context $C3=W3$ (2)

Context weight for the context $C4=W4$, etc. (3)

At step (circled number 4), the profile weight for each profile of the plurality of profiles is obtained by combining all the determined context weights as:
For profile P1, the profile weight is:

$V1=W1+W3+W4+$ (4)

Similarly for profile P2, the profile weight is:

$V2=W2+Wn$ (5)

Similarly the profile weights V3, V4, V5 etc. are determined by the arbitration module 136 of the electronic device 100. The profile weights are used to determine the second profile from the plurality of profiles, where the second profile is enabled and the first profile is disabled.

Figure 2:
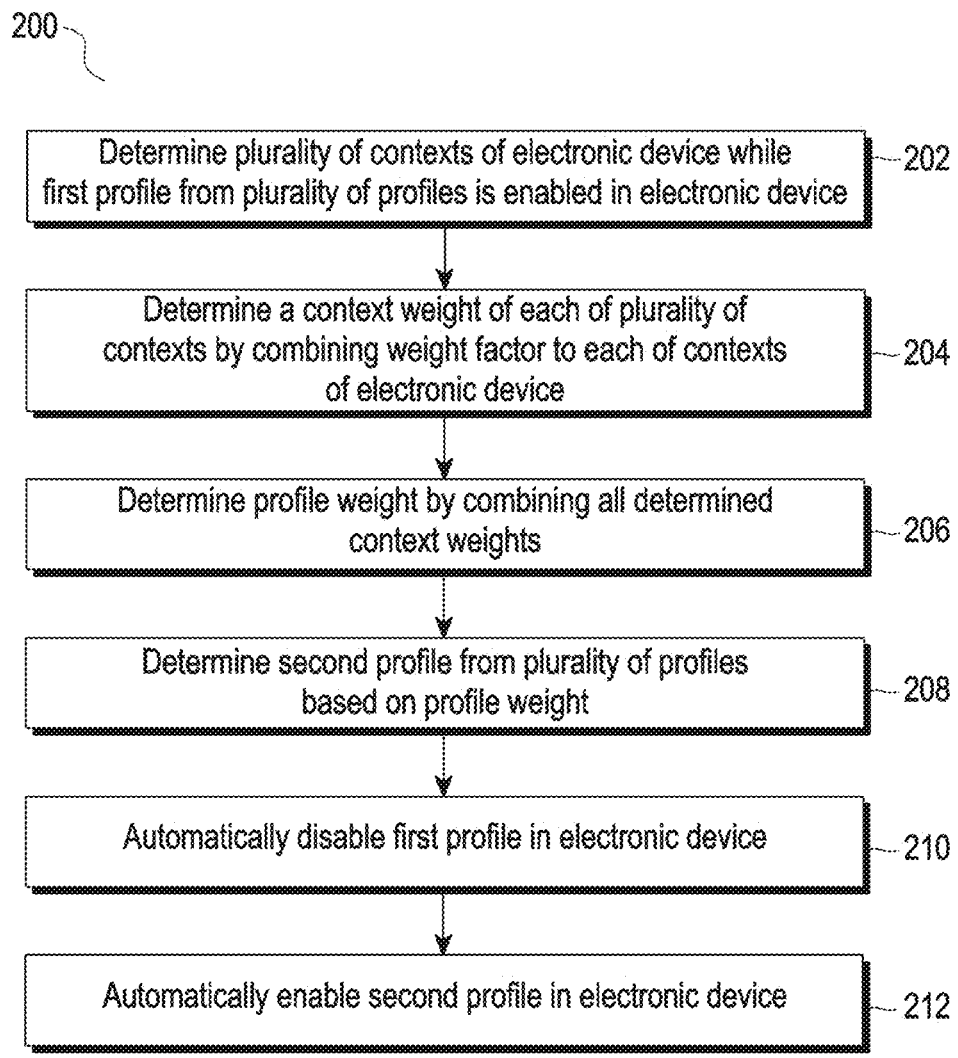
FIG. 2 is a flowchart for a method for automatically switching among the plurality of profiles in the eSIM of the electronic device, according to an embodiment as disclosed herein.

FIG. 2 is a flowchart 200 for a method for automatically switching among the plurality of profiles in the eSIM 120 of the electronic device 100, according to an embodiment as disclosed herein.

Referring to the FIG. 2, at step 202, the electronic device 100 determines the plurality of contexts of the electronic device 100 while the first profile from the plurality of profiles is enabled in the electronic device 100. For example, in the electronic device 100 as illustrated in the FIG. 1A, the processor 130 may be configured to determine the plurality of contexts of the electronic device 100 while the first profile from the plurality of profiles is enabled in the electronic device 100.

At step 204, the electronic device 100 determines the context weight of each of the plurality of contexts by combining the weight factor to each of contexts of the electronic device 100. For example, in the electronic device 100 as illustrated in the FIG. 1A, the processor 130 may be configured to determine the context weight of each of the plurality of contexts by applying the weight factor to each of the contexts of electronic device 100.

At step 206, the electronic device 100 determines the profile weight by combining all the determined context weights. For example, in the electronic device 100 as illustrated in the FIG. 1A, the processor 130 may be configured to determine the profile weight by combining all the determined context weights.

At step 208, the electronic device 100 determines the second profile from the plurality of profiles based on the profile weight. For example, in the electronic device 100 as illustrated in the FIG. 1A, the processor 130 may be configured to determine the second profile from the plurality of profiles based on the profile weight.

At step 210, the electronic device 100 automatically disables the first profile in electronic device 100. For example, in the electronic device 100 as illustrated in the FIG. 1A, the processor 130 may be configured to automatically disable first profile in electronic device 100.

At step 212, the electronic device 100 automatically enables the second profile in electronic device 100. For example, in the electronic device 100 as illustrated in the FIG. 1A, the processor 130 may be configured to automatically enable the second profile in electronic device 100.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 3 illustrates the plurality of electronic devices in synchronization using which the plurality of contexts is determined by the electronic device 100, according to an embodiment as disclosed herein.

In an embodiment, all the software components of the arbitration module 136 may be included in the first electronic device 100. In another embodiment, the software components of the arbitration module 136 may lie in a plurality of distributed electronic devices which may be connected to each other/communicating with each other through various protocols for communication or may be in synchronization through a common account.

Referring to the FIG. 3, a network system according to an embodiment may include a first electronic device 100a, a second electronic device 100b and a cloud server 1000, which are in synchronization with each other. Then the arbitration module 136 may not completely lie within the processor 130 of the first electronic device 100*a*. Rather, one or more components of the arbitration module 136 are distributed among the first electronic device 100*a*, the second electronic device 100*b*, and the cloud server 1000.

The presence of the component of the arbitration module 136 within the plurality of electronic devices enables a comprehensive determination of the plurality of contexts of the electronic device 100 based on factors such as the user history and the user preferences. For example, if the user preference in the second electronic device 100*b* for accessing a video content is profile 2 (i.e., a specific telecom operator with a specific data plan), then the same user preference may be applied in the first electronic device 100*a* while determining the best profile to be used.

At step 1 (circled number 1), the component of the arbitration module 136 monitors and determines the plurality of contexts related specifically to the first electronic device 100*a*. At step 2 (circled number 2), the component of the arbitration module 136 evaluates, monitors, and determines the plurality of contexts related specifically to the second electronic device 100*b* which are different from the plurality of contexts related to the first electronic device 100*a*. At step 3 (circled number 3), the component of the arbitration module 136 which is in the cloud server 1000 evaluates the plurality of contexts related to a generalized data, like general user preferences, recommendations from global survey, etc. The first electronic device 100*a* determines the second profile to be switched to from the first profile based on the evaluations of all the component of the arbitration module 136 which may be located in various locations.

Hence, unlike to the conventional methods and systems where the switching between the various profiles of the eSIM 120 is performed manually by the user, in the proposed method, the switching is performed automatically by taking into consideration the comprehensive contexts associated with the electronic device 100.

Figure 4:
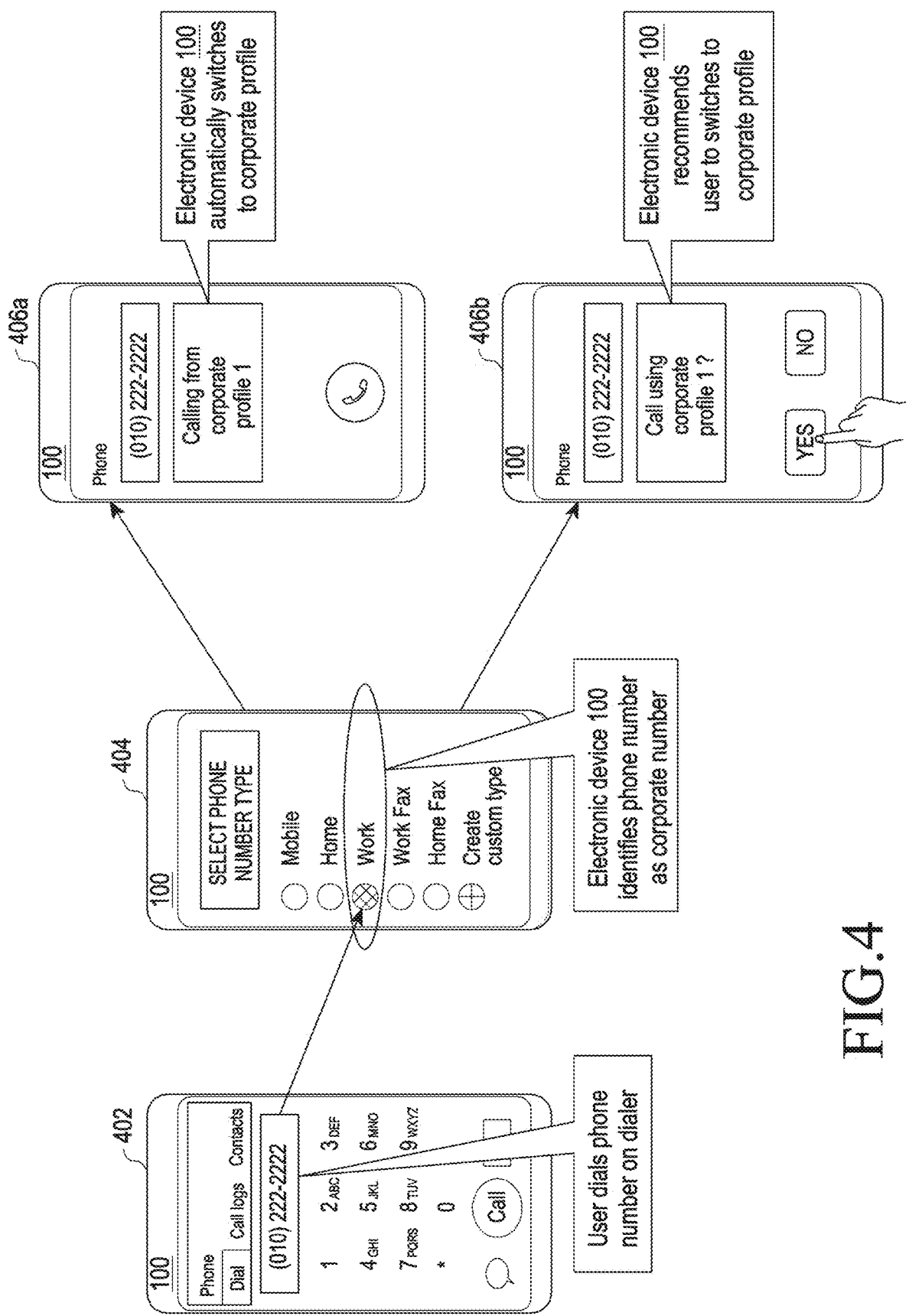
FIG. 4 illustrates an example scenario for switching from a first profile to a second profile in the electronic device based on a type of a phone number, according to an embodiment as disclosed herein.

FIG. 4 illustrates an example scenario for switching from the first profile to the second profile in the electronic device 100 based on the type of the phone number, according to an embodiment as disclosed herein.

For example, the electronic device 100 may include a plurality of profiles (profile SIM 1, profile SIM 2, profile SIM 3, etc.)

Referring to FIG. 4, at step 402, the electronic device 100 determines that the profile SIM 1 is currently enabled which is for example a 'personal profile'. Consider that the user dials a phone number using the electronic device 100.

At step 404, the electronic device 100 identifies the type of the phone number dialed by the user as a 'corporate number'. For example, the memory 140 of the electronic device 100 may store the phone number and the type of the phone number (e.g., a home phone number, a work phone number, a home fax number, a work fax number, etc.) in association with each other. When the phone number is entered, the processor 130 may retrieve the type of the phone number from the member 140 by looking up the type associated with the entered phone number. In another example, the electronic device 100 may identify the type of the phone number by communicating with an external database containing phone numbers and associated phone number types. The profile SIM 4 is designated as the corporate profile by the user. Further, the electronic device 100 determines the profile weight for the plurality of profiles i.e., the profile weight for the profile SIM 1, the profile weight for the profile SIM 2, the profile weight for the profile SIM 3, the profile weight for the profile SIM 4, etc and determines the profile SIM 4 as the corporate profile among the plurality of profiles based on the profile weight for the profile SIM 4.

At step 406*a*, the electronic device 100 automatically switches from the profile SIM 1 to the profile SIM 4 by disabling the profile SIM 1 and automatically enabling the profile SIM 4.

In another embodiment, at step 406*b*, the electronic device 100, after determining the profile SIM 4 as the corporate profile among the plurality of profiles, provides a message on the screen recommending switching to the profile SIM 4 which is the corporate profile. The user may manually enable the profile SIM 4 and disable the profile SIM 1 on the electronic device 100.

The electronic device 100 also allows the user to create a custom type for different corporate profiles, like corporate profile 1, corporate profile 2, etc. Further, the electronic device 100 will automatically switch to the respective corporate profile based on the phone number dialed by the user.

Figure 5:
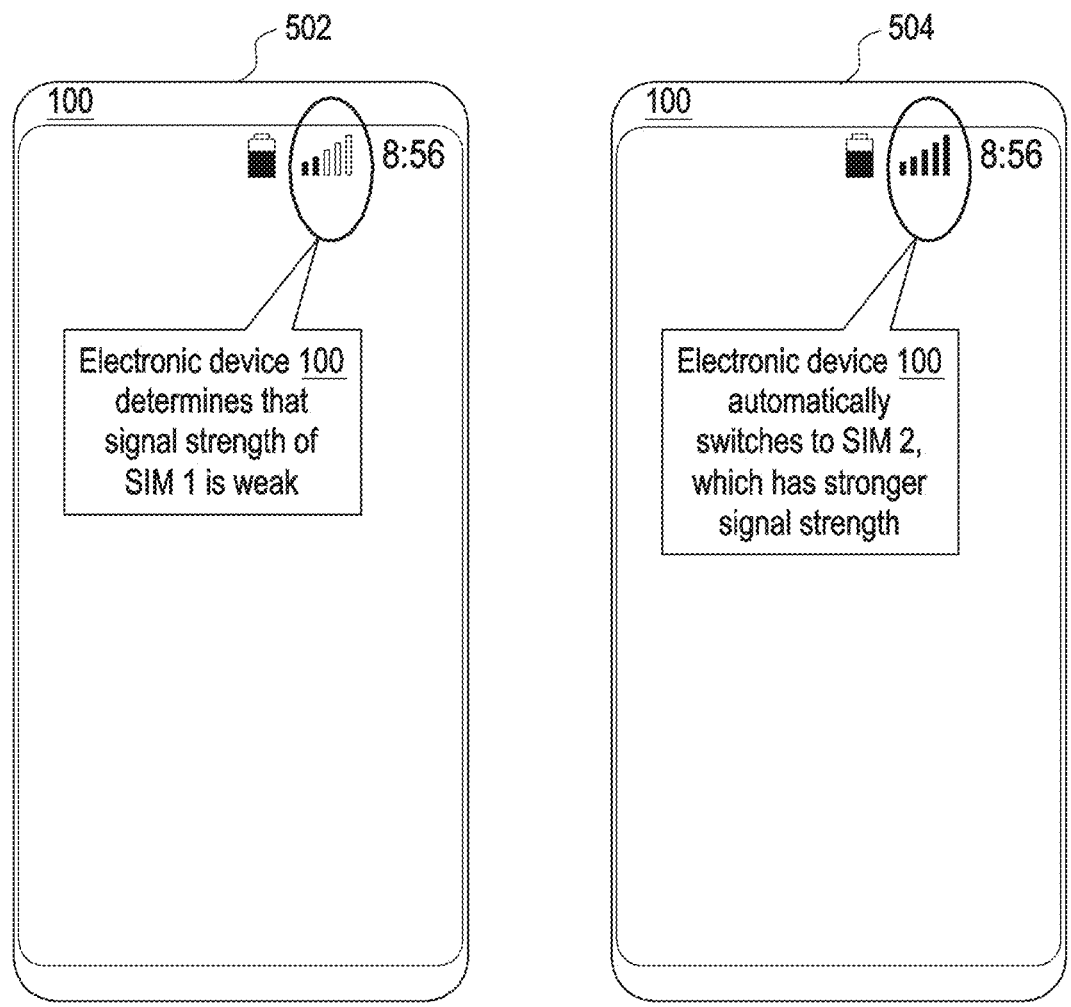
FIG. 5 illustrates an example scenario for automatically switching from the first profile to the second profile in the electronic device based on signal strength of the network, according to an embodiment as disclosed herein.

FIG. 5 illustrates an example scenario for automatically switching from the first profile to the second profile in the electronic device 100 based on the context of the signal strength of the network, according to an embodiment as disclosed herein.

Signal strength is an important parameter for the electronic device 100 to stay connected to the network. A weak signal affects users experience along with leading battery drainage of the electronic device 100. When the electronic device 100 has a low battery or when power saving is needed then the profile having a strong signal strength is required to avoid battery drainage. Also, electronic devices 100 such as wearable devices may need to have the profile with a strong signal strength to avoid any possible battery issues.

Consider that the electronic device 100 has a plurality of profiles (e.g., profile SIM 1, profile SIM 2, profile SIM 3, etc.) and the profile SIM 1 is currently active in the electronic device 100.

Referring to the FIG. 5, at step 502, the electronic device 100 determines that the signal strength of the profile SIM 1 which is currently active on the electronic device 100 is weak based on the context weight.

At step 504, the electronic device 100 determines the profile weight for the plurality of profiles with a higher context weight for the signal strength context. Further, the electronic device 100 determines that the profile SIM 2 has the highest weight among the plurality of profiles with respect to the signal strength context. Therefore, the electronic device 100 automatically switches from the profile SIM 1 to the profile SIM 2 by disabling the profile SIM 1 and automatically enabling the profile SIM 2.

Figure 6:
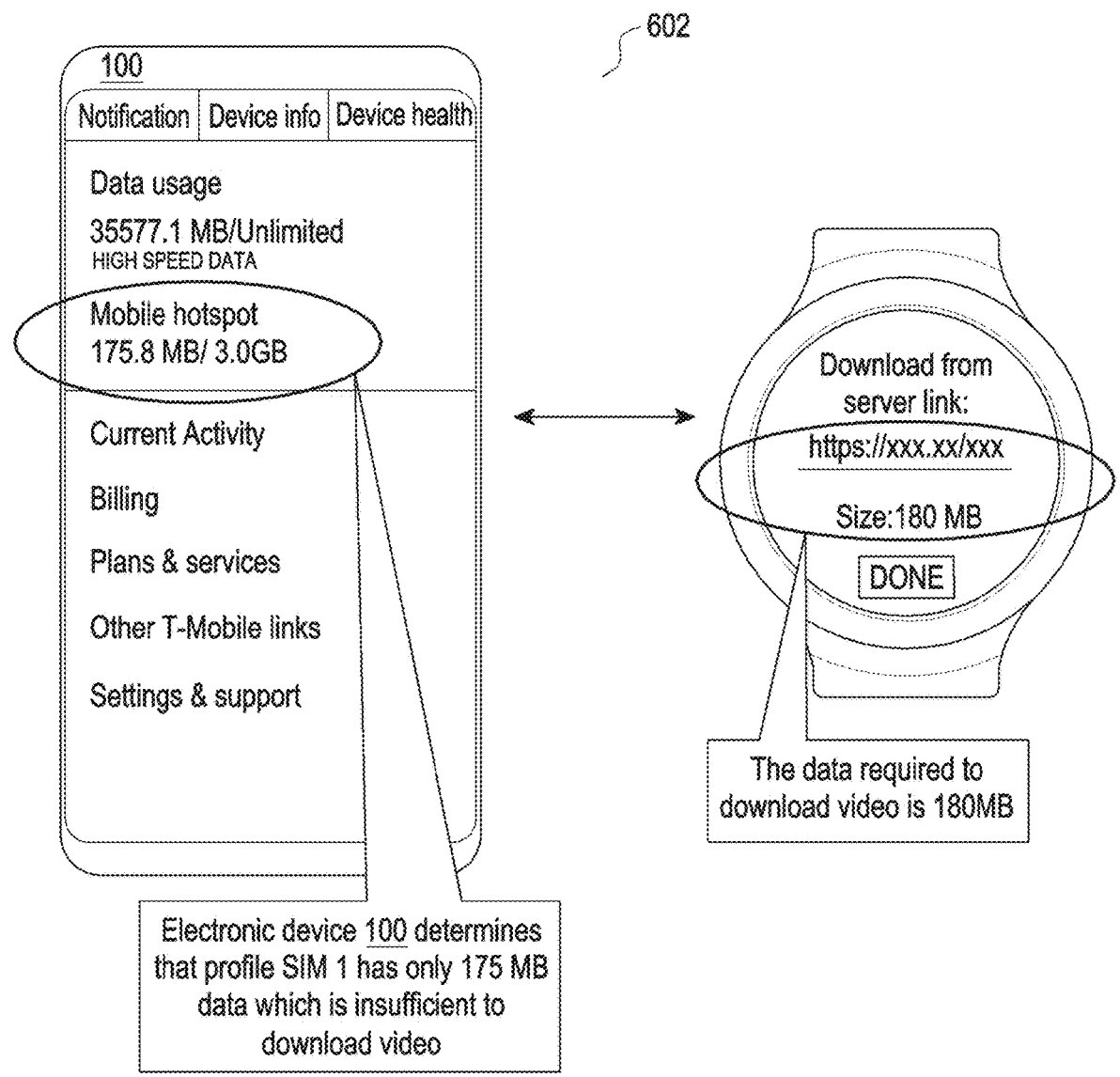
FIG. 6 illustrates an example scenario for automatically switching from the first profile to the second profile in the electronic device based on a data availability in the first profile, according to an embodiment as disclosed herein.

FIG. 6 illustrates an example scenario for automatically switching from the first profile to the second profile in the electronic device 100 based on the data availability in the first profile, according to an embodiment as disclosed herein.

Consider that the electronic device 100 has a plurality of profiles (e.g., profile SIM 1, profile SIM 2, profile SIM 3, etc.) and the profile SIM 1 is currently active in the electronic device 100. Consider that the user wants to download a video from a server having a file size of 180 MB.

Referring to FIG. 6, when the electronic device 100 receives a user command of downloading the video, the electronic device 100 determines whether the available data in the profile SIM 1 is insufficient to download the video. In this scenario, the electronic device 100 determines that the available data in the profile SIM 1 is only 175 MB and therefore is not sufficient to download the video having the file size of 180 MB.

The electronic device 100 determines the profile weight for the plurality of profiles with a higher context weight for the data availability context. Further, the electronic device 100 determines that the profile SIM 2 has the highest weight among the plurality of profiles with respect to the data availability context (i.e., the profile SIM 2 has data availability of more than or equal to 180 MB to complete the task of downloading the video). Therefore, the electronic device 100 automatically switches from the profile SIM 1 to the profile SIM 2 by disabling the profile SIM 1 and automatically enabling the profile SIM 2 to enable seamless video download.

Figure 7:
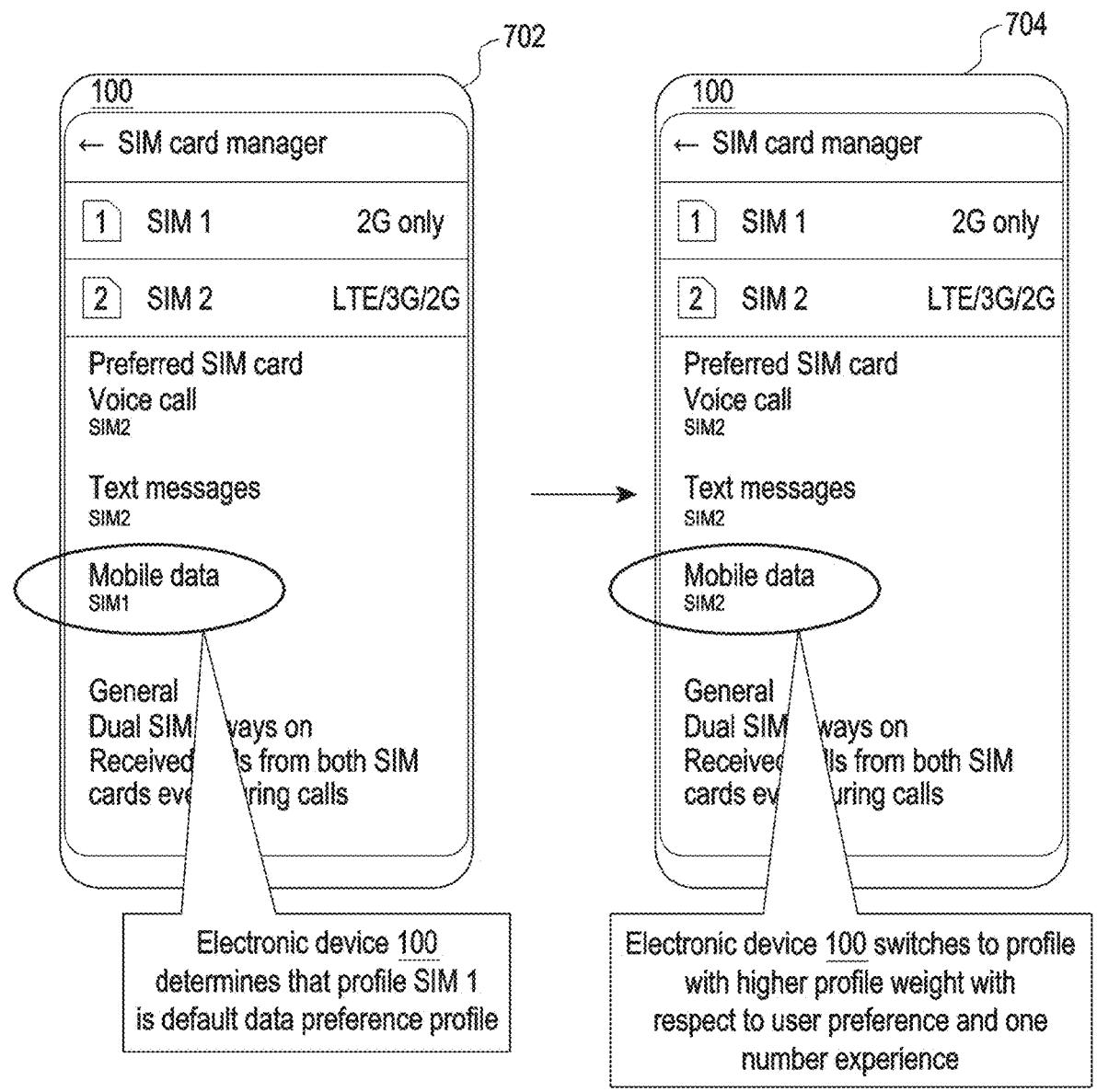
FIG. 7 illustrates an example scenario for automatically switching from the first profile to the second profile in the electronic device based on a plurality of contexts, according to an embodiment as disclosed herein.

FIG. 7 illustrates an example scenario for automatically switching from the first profile to the second profile in the electronic device 100 based on a plurality of contexts, according to an embodiment as disclosed herein.

Consider that the electronic device 100 has a plurality of profiles (e.g., profile SIM 1, profile SIM 2, profile SIM 3, etc.) and the first profile is the profile SIM 1 which is currently active in the electronic device 100.

Referring to FIG. 7, at step 702, the electronic device 100 determines that the profile SIM 1 is a default data preference profile in the electronic device 100.

At step 704, the electronic device 100 determines the profile weight for the plurality of profiles with a higher context weight for user preference and one number experience. The one number experience refers to a scenario where a primary electronic device (e.g. a smart phone) and a secondary electronic device (e.g. a smart watch) work independent of each other. However, the primary electronic device and the secondary electronic device use a same Mobile Station International Subscriber Directory Number (MSISDN) and hence both will receive an incoming call together (through MNO supported standard call forking process), and whichever device will pick the incoming call first that will take up the control.

Further, based on the profile weight the electronic device 100 determines that the profile SIM 2 has the highest weight for data related activities based on the context weights of the user preference and one number experience. Therefore, the electronic device 100 automatically switches from the profile SIM 1 to the profile SIM 2 by disabling the profile SIM 1 and automatically enabling the profile SIM 2.

Figure 8:
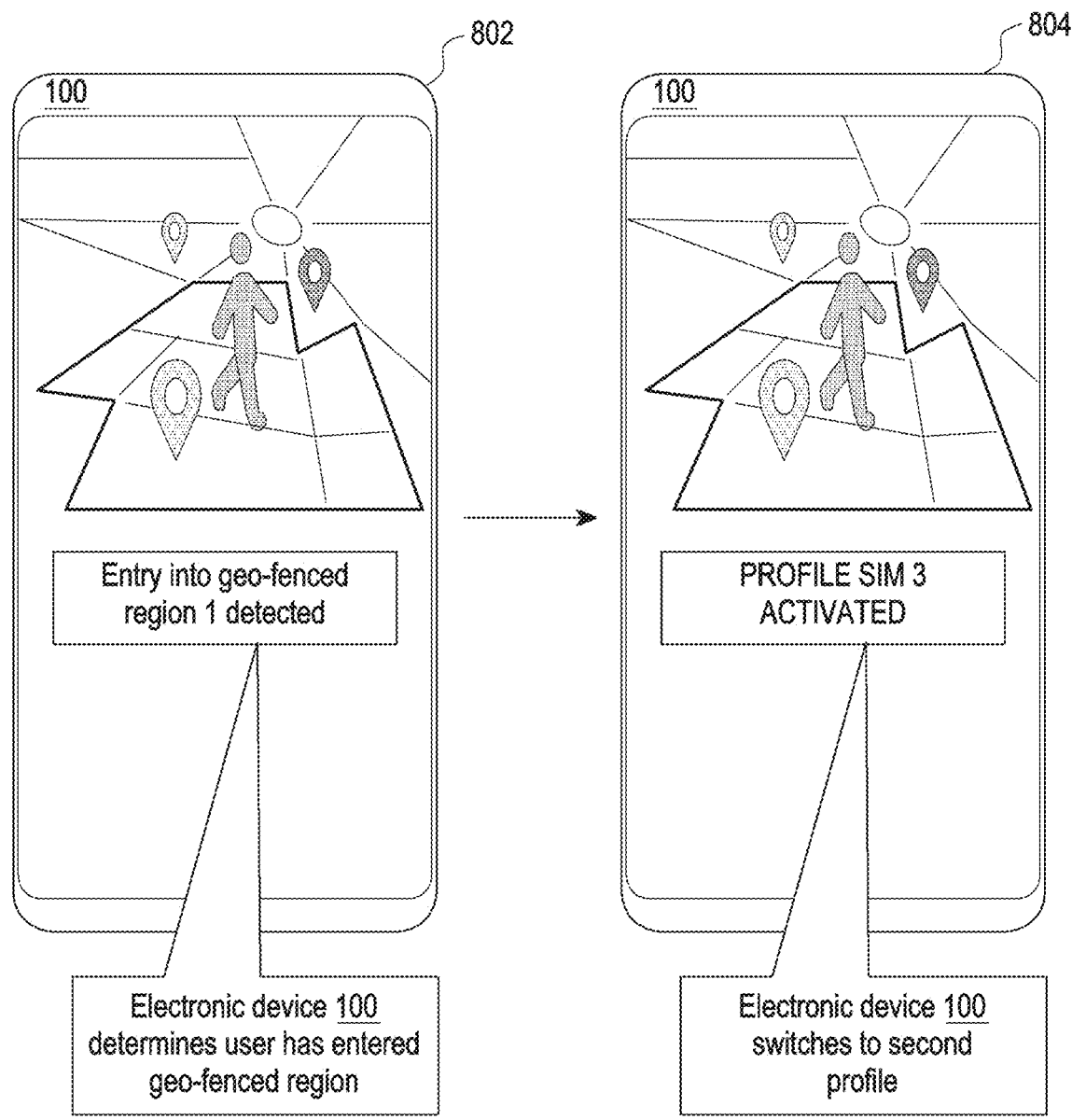
FIG. 8 illustrates an example scenario for automatically switching from the first profile to the second profile in the electronic device based a location of the electronic device, according to an embodiment as disclosed herein.

FIG. 8 illustrates an example scenario for automatically switching from the first profile to the second profile in the electronic device 100 based on based the location of the electronic device 100, according to an embodiment as disclosed herein.

Consider that the electronic device 100 has a plurality of profiles i.e., profile SIM 1, profile SIM 2, profile SIM 3, etc. Consider that the user has defined a plurality of geo-fenced regions based on the preferences. For example consider that the user has geo fenced the regions based on various states. Also consider that the user is mobile and enters the geo-fenced region, location 1.

Referring to the FIG. 8, at step 802, the electronic device 100 determines that the profile SIM 1 is currently enabled and that the user has entered the geo-fenced region, location 1. Further, the electronic device 100 monitors plurality of contexts such as user preferences, validity of the profiles, location of the electronic device 100, signal strength, data availability etc.

The electronic device 100 then determines the context weight of the plurality of contexts and computes the profile weight for each of the profile SIM 1, the profile SIM 2, the profile SIM 3, etc. by combining all the determined context weights. Further, the electronic device 100 determines that the profile SIM 4 is the best profile among the plurality of profiles based on the user preference, the locations visited by the user and a tariff plan applicable in the region, etc. Further, at step 804, the electronic device 100 automatically switches from the profile SIM 1 to the profile SIM 4 by disabling the profile SIM 1 and automatically enabling the profile SIM 4.

Similarly, consider that the user has a dedicated office profile in the eSIM 120 to be used when the user is in the office premises. The electronic device 100 is configured to automatically switch from the currently active profile to the dedicated office profile when the electronic device 100 detects that the user has entered the office premises, based on the location contextual parameter.

In another embodiment, user actions of punching-in to the office premises may be used as a trigger to automatically enable the dedicated office profile and the user action of punching-out of the office premises may be used as a trigger to automatically disable the dedicated office profile in the eSIM 120 of the electronic device 100.

Figure 9:
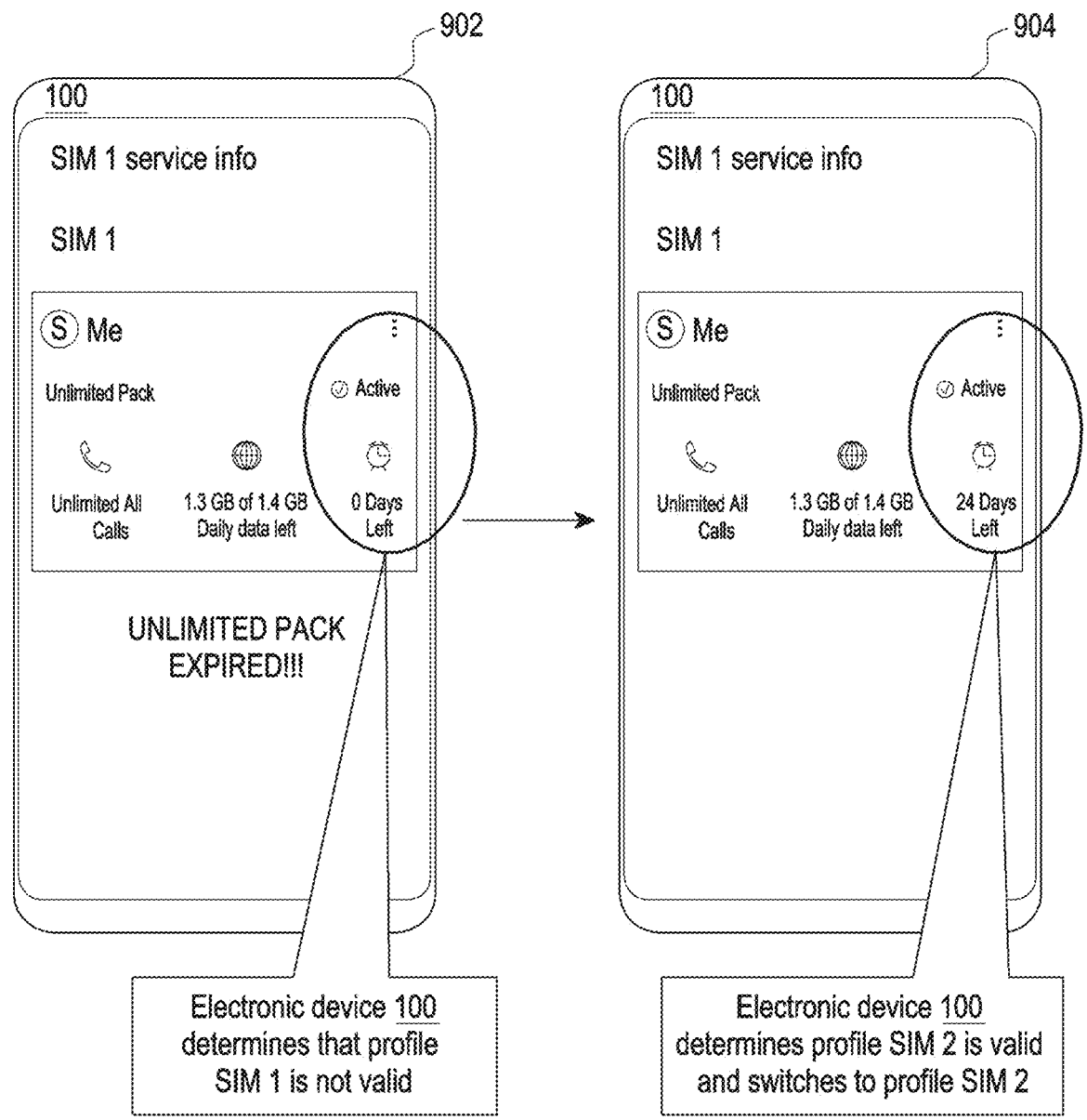
FIG. 9 illustrates an example scenario for automatically switching from the first profile to the second profile in the electronic device based on a validity of the profile, according to an embodiment as disclosed herein.

FIG. 9 illustrates an example scenario for automatically switching from the first profile to the second profile in the electronic device 100 based on the validity of the profile, according to an embodiment as disclosed herein.

Consider that the electronic device 100 has a plurality of profiles (i.e., profile SIM 1, profile SIM 2, profile SIM 3, etc.).

Referring to FIG. 9, the electronic device 100 determines that the profile SIM 1 is currently enabled and is in the active state. Further, at step 902, the electronic device 100 while monitoring a plurality of contexts such as validity of the profiles, location of the electronic device 100, signal strength, data availability etc., determines that the validity of the profile SIM 1 has expired.

The electronic device 100 then determines the context weight of the plurality of contexts and computes the profile weight for each of profile SIM 2, profile SIM 3, etc. by combining all the determined context weights other than the invalid profile SIM 1. Further, the electronic device 100 determines that the profile SIM 2 is the best profile among the plurality of profiles based on the profile weight. Further, at step 904, the electronic device 100 automatically switches from the profile SIM 1 to the profile SIM 2.

Unlike the conventional methods and systems, in the proposed method the electronic device 100 seamlessly switches from the first profile and enables the second profile which is valid to be active in the electronic device 100. Thus, the proposed method ensures continuity of services for the user and provides a seamless user experience.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for switching among a plurality of embedded subscriber identity module (eSIM) profiles in an electronic device, the method comprising:
   determining a plurality of initial contexts of the electronic device while a first eSIM profile of the plurality of eSIM profiles is enabled in the electronic device;
   based on deselecting of at least one among the plurality of initial contexts, obtaining a plurality of remaining contexts by excluding the deselected at least one of the plurality of initial contexts;
   determining a context weight of each of the plurality of remaining contexts by applying a weight factor to each of the plurality of remaining contexts of the electronic device;
   determining a profile weight by combining the context weight of each of the plurality of remaining contexts, for each of the plurality of eSIM profiles;
   determining, from the plurality of eSIM profiles, a second eSIM profile that has a highest profile weight, based on the profile weight of each of the plurality of eSIM profiles, while the first eSIM profile is enabled in the electronic device; and
   switching from the first eSIM profile to the second eSIM profile in the electronic device,
   wherein the plurality of initial contexts comprise a device-based context indicating whether the electronic device is designated as a primary electronic device or a secondary electronic device.

2. The method of claim 1, further comprising:
   displaying the second eSIM profile on a screen of the electronic device, together with the plurality of remaining contexts used in determining the profile weight.

3. The method of claim 1, wherein the switching from the first eSIM profile to the second eSIM profile in the electronic device comprises:
   disabling the first eSIM profile in the electronic device; and
   enabling the second eSIM profile in the electronic device.

4. The method of claim 1, wherein the plurality of initial contexts of the electronic device are determined based on a plurality of contextual parameters of the electronic device, and
   wherein the plurality of contextual parameters include an amount of available cellular data.

5. The method of claim 1, wherein the plurality of initial contexts of the electronic device are determined based on a plurality of contextual parameters of the electronic device, and
   wherein the plurality of contextual parameters include an indication of whether a phone number dialed by the electronic device is a corporate phone number.

6. The method of claim 1, wherein the weight factor is determined based on a plurality of contextual parameters and a user preference, and the plurality of contextual parameters include at least one of a location of the electronic device, a type of a dialed number, a tariff plan of the plurality of eSIM profiles, a signal strength associated with the plurality of eSIM profiles, and history information.

7. The method of claim 6, wherein
   the history information indicates an eSIM profile used in the location of the electronic device; among the plurality of eSIM profiles.

8. A non-transitory computer-readable storage medium storing a program that is executable by a computer to perform the method of claim 1.

9. An electronic device for switching among a plurality of embedded subscriber identity module (eSIM) profiles in the electronic device, the electronic device comprising at least one processor configured to:
   determine a plurality of initial contexts of the electronic device while a first eSIM profile of the plurality of eSIM profiles is enabled in the electronic device;
   based on deselecting of at least one among the plurality of initial contexts, obtain a plurality of remaining contexts by excluding the deselected at least one of the plurality of initial contexts;
   determine a context weight of each of the plurality of remaining contexts by applying a weight factor to each of the plurality of remaining contexts of the electronic device;
   determine a profile weight by combining the context weight of each of the plurality of remaining contexts, for each of the plurality of eSIM profiles;
   determine, from the plurality of eSIM profiles, a second eSIM profile that has a highest profile weight, based on the profile weight of each of the plurality of eSIM profiles, while the first eSIM profile is enabled in the electronic device; and
   switch from the first eSIM profile to the second eSIM profile in the electronic device,
   wherein the plurality of initial contexts comprise a device-based context indicating whether the electronic device is designated as a primary electronic device or a secondary electronic device.

10. The electronic device of claim 9, further comprising a display,
    wherein the at least one processor is further configured to:
    control the display to display the second eSIM profile together with the plurality of remaining contexts used in determining the profile weight.

11. The electronic device of claim 9, wherein the at least one processor is further configured to:
    disable the first eSIM profile in the electronic device; and
    enable the second eSIM profile in the electronic device.

12. The electronic device of claim 9, wherein the at least one processor is further configured to determine the plurality of initial contexts of the electronic device based on a plurality of contextual parameters of the electronic device, and
    wherein the plurality of contextual parameters include an amount of available cellular data.

13. The electronic device of claim 9, wherein the plurality of initial contexts of the electronic device are determined based on a plurality of contextual parameters of the electronic device, and
    wherein the plurality of contextual parameters include an indication of whether a phone number dialed by the electronic device is a corporate phone number.

14. The electronic device of claim 9, wherein the weight factor is determined based on a plurality of contextual parameters and a user preference, and the plurality of contextual parameters include at least one of a location of the electronic device, a type of a dialed number, a tariff plan of the plurality of eSIM profiles, a signal strength associated with the plurality of eSIM profiles, and history information.

15. The electronic device of claim 14, wherein the history information indicates an eSIM profile used in the location of the electronic device among the plurality of eSIM profiles.

\* \* \* \* \*